Oct. 9, 1973    J. B. VAN ERP    3,764,467
FAST BREEDER REACTOR PROTECTION SYSTEM
Filed Dec. 22, 1971    8 Sheets-Sheet 1

Oct. 9, 1973  J. B. VAN ERP  3,764,467

FAST BREEDER REACTOR PROTECTION SYSTEM

Filed Dec. 22, 1971  8 Sheets-Sheet 6

United States Patent Office 3,764,467
Patented Oct. 9, 1973

3,764,467
FAST BREEDER REACTOR PROTECTION SYSTEM
Jan B. van Erp, Hinsdale, Ill., assignor to the United States of America as represented by the United States Atomic Energy Commission
Filed Dec. 22, 1971, Ser. No. 211,020
Int. Cl. G21c 7/00, 17/00
U.S. Cl. 176—19 R
3 Claims

ABSTRACT OF THE DISCLOSURE

Reactor protection is provided for a liquid-metal-fast breeder reactor core by measuring the coolant outflow temperature from each of the subassemblies of the core. The outputs of the temperature sensors from a subassembly region of the core containing a plurality of subassemblies are combined in a logic circuit which develops a scram alarm if a predetermined number of the sensors indicate an over temperature condition. The coolant outflow from a single subassembly can be mixed with the collant outflow from adjacent subassemblies prior to the temperature sensing to increase the sensitivity of the protection system to a single subassembly failure. Coherence between the sensors can be required to discriminate against noise signals.

CONTRACTURAL ORIGIN OF THE INVENTION

The invention described herein was made in the course of, or under, a contract with the United States Atomic Energy Commission.

BACKGROUND OF THE INVENTION

In order to provide protection against malfunctioning of a reactor core, scram channels are provided which sense the malfunctions and act to scram the reactor. In a light water reactor of 1,000 megawatts size, between 15 and 20 scram channels are provided. However, the fuel in a breeder reactor is not arranged in its most reactive configuration and therefore it is necessary to monitor each individual subassembly instead of representative subassemblies in order to provide sufficient protection. Since a 1,000 megawatt plant has a core with approximately 265 subassemblies, a scram capability for each individual subassembly would require 265 scram channels. Some systems have been proposed with 2 scram channels per subassembly one on flow and one on temperature which would require approximately 530 scram channels. In order to provide for reliability and distinguish against noise effects, the use of more than one sensor per scram channel has also been proposed. Where a two out of three sensor reaction is required in order to actuate a scram channel, the number of sensors required could then be more than 1500. Requiring this large number of sensors and scram channels would put the breeder reactor under a severe competitive disadvantage with regards to initial cost. Further, the cost of preventative maintenance and the problems of core design and refueling operations would be high because of the large number of sensors and leads. With such a large number of scram channels, the possibility of spurious scrams would increase adding to the operating costs of the reactor.

It is therefore an object of this invention to provide an improved reactor protection system requiring a minimum number of scram channels.

Another object of this invention is to provide a reactor protection system providing protection against accidents in each subassembly while maintaining a minimum number of scram channels.

Another object of this invention is to provide a reactor protection system which distinguishes between spurious alarms and actual alarms to prevent a spurious scram.

SUMMARY OF THE INVENTION

In practicing this invention a reactor core is divided into a plurality of subassembly regions with each of the subassembly regions containing a predetermined number of subassemblies. Each of the subassemblies has located therein a sensor, which, for example, may be a temperature sensor positioned in the coolant outflow from the subassembly. The temperature sensor would measure the temperature of the coolant coming from the particular subassembly and with the temperature greater than a particular amount an alarm signal would be generated. The sensors from each core region are coupled to a single logic circuit which develops a scram alarm when a predetermined number of the sensors develop alarm signals. The predetermined number of sensors which are required to develop alarm signals would be less than the total number of sensors in the subassembly region. For example, a subassembly region might consist of one subassembly plus its three adjacent concentric rows, 37 subassemblies. A logic circuit would develop a scram alarm if 4 or more of the temperature sensors in the subassembly region developed alarm signals. Additional protection could be provided against spurious scrams by requiring a coherance between the generation of the alarm signals so that a noise signal appearing on one sensor would not develop an alarm signal which could later trigger a spurious scram. In order to provide protection against a serious accident in a single subassembly, the portion of the coolant outflow from each subassembly could be mixed with the adjacent subassemblies so that the accident in the single subassembly would actuate sensors in the adjacent assemblies to provide the required number of alarm signals to generate the scram signal.

DETAILED DESCRIPTION OF THE INVENTION

Figure 1:
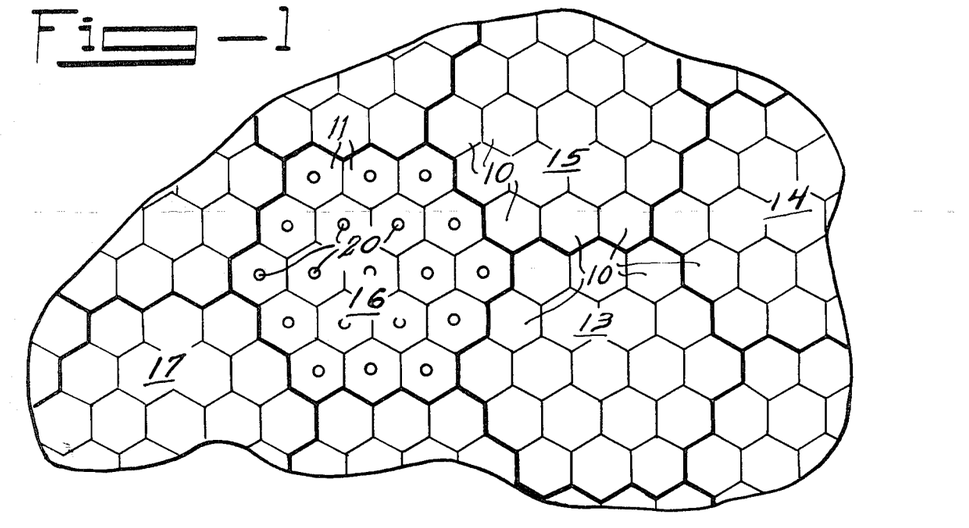
FIG. 1 shows the subassembly and subassembly region arrangement of a portion of a reactor core.

Referring to FIG. 1, there is shown a section of a reactor core including a plurality of subassemblies 10 and 11. These subassemblies are of a construction well known in the art and each includes a plurality of fuel pins which develop heat energy when the reactor is in operation. Coolant flowing through the subassemblies around the fuel pins is used to cool the fuel pins and to act to extract the heat energy from the fuel subassemblies.

In liquid-metal-fast breeder reactors, the cooling fluid may be a liquid metal such as liquid sodium. The fast breeder reactor operates at a very high temperature and requires that sensors be placed in the core to measure parameters to determine if there is a malfunction in the core. It is particularly important that there be a sensing and scram capability for localized core accidents since the fuel is not arranged in its most reactive configuration and an accident can lead to an increase in the reactivity and energy output of the core. This has led to some proposed systems having two scram channels per subassembly (one on flow and one on temperature) resulting in not less than approximately 30 scram channels for a 1,000 megawatt plant. In addition, in order to provide sensor redundancy, it has been proposed that at least three flow sensors and three temperature sensors be used for each subassembly.

In the present invention, the number of required scram channels and sensors is greatly reduced. The core is divided into a number of subassembly regions each having a predetermined number of subassemblies. Each subassembly has a temperature sensor 20 positioned to measure the temperature of the coolant leaving the subassembly. While temperature is the parameter measured by the sensors in this example, other parameters such as coolant flow could be measured. In FIG. 1 and subsequent figures, only a representative number of sensors are shown. However, each subassembly has a temperature sensor. The output signals from each sensor are combined in logic matrices to develop a scram signal when there is a rise in the outlet temperature of a predetermined number of subassemblies. Further protection can be provided by thermal coupling between the outlet coolant of adjacent subassemblies. Protection against spurious scrams due to "noise" on the temperature signal from the sensors can be obtained by making use of the coherence in the temperature signals of adjacent subassemblies. In this way, a substantial reduction in the number of scram channels can be obtained while maintaining the same level of protection. For example, for a subassembly region of 7 or 19 subassemblies, the number of scram channels would be, respectively, 38 or 14 as compared to 265 scram channels for the system using one scram channel per subassembly. Also, the number of temperature sensors can be reduced by a factor of 3 since redundancy requirements are met by combining sensors from different subassemblies.

Referring again to FIG. 1, the portion of the core shown is divided up into a number of subassembly regions 13, 14, 15, 16 and 17. Each of the subassembly regions contains a number of core subassemblies. In the example shown, each region, outlined by the heavy lines, contains 19 subassemblies. The number of subassemblies in each core region is a matter of design choice. In order to keep the rate of spurious scrams low, the number of subassemblies in each core region (N) should not be too large. However, in order to keep the number of scram channels at a reasonably low value, N should be a large number. If one were to choose a subassembly region consisting of 37 subassemblies, that is, 1 subassembly plus its 3 adjacent concentric rows of subassemblies, a reactor would have 7 to 8 scram channels. If one were to require overlapping between adjacent regions over one peripheral row of subassemblies, a configuration to be discussed in detail later in the specification, 10 scram channels would be required for the same size core. If one were to choose a subassembly region having 19 subassemblies corresponding to a core region consisting of 1 subassembly plus its two adjacent concentric rows of subassemblies, as is shown in FIG. 1, approximately 14 scram channels would be required without overlapping and approximately 21 scram channels would be required with overlapping.

Each of the subassemblies in the core has a sensor 20 inserted in the coolant stream flowing out of the subassembly. Each sensor has a cable leading therefrom to circuitry which will develop a scram alarm when a particular number of the sensors in the core region indicate a malfunction.

Figure 2:
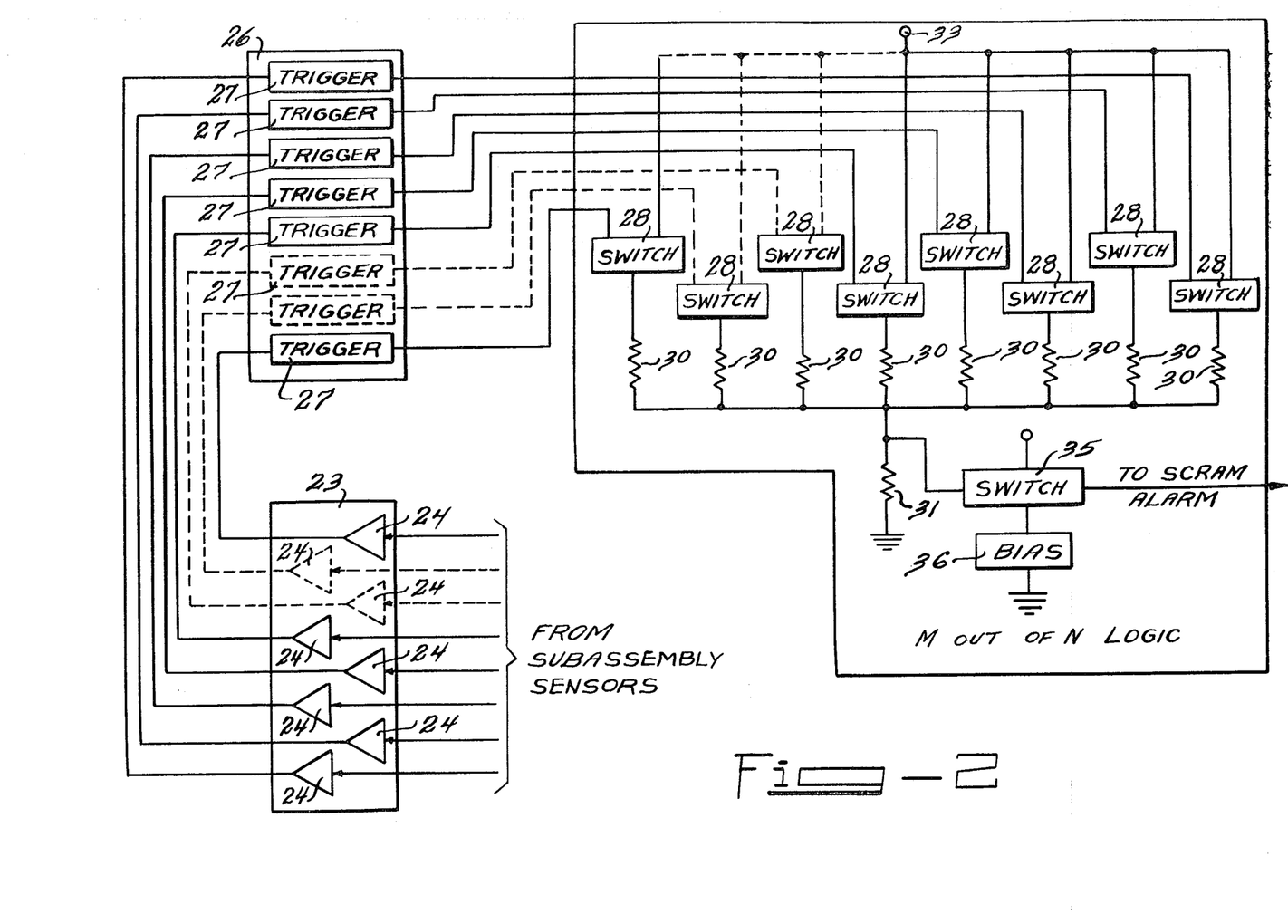
FIG. 2 is a partial schematic and partial block diagram of a circuit for developing a scram alarm.

Referring to FIG. 2, there is shown a partial block diagram and partial schematic of circuitry which can be used for this purpose. An amplifying unit 23 contains a plurality of amplifiers 24 each connected to a separate one of the sensors in a particular core region. In the example shown in FIG. 2, each sensor in a particular core region is connected to a separate amplifier in amplifying unit 23 and only sensors from this particular core region are connected to amplifying units therein. The output of each amplifier 24 is connected to a separate trigger circuit in trigger unit 26. The output signal from each of the amplifiers 24 is a function of the temperature measured by the temperature sensor in the core. When the temperature exceeds a predetermined value, the output of an amplifier 24 is sufficient to actuate the trigger circuit connected thereto. The output of each of the trigger circuits 27 is connected to a separate switch 28 in the "M out of N" logic circuit. Switches 28 can be relays or transistor switches or any similar type of switch which can be actuated by a signal from trigger 27. Each switch 28 is in series with a separate resistor 30. The resistors 30 and resistor 31 form a voltage divider circuit which is coupled between a terminal 33 and ground. With a voltage applied to terminal 33, the current flowing through resistor 31 is dependent upon the number of switches 28 which are actuated. Each time a switch 28 is actuated, an additional resistor 30 is coupled in parallel with other resistors 30 and the current flow through resistor 31 increases, raising the potential applied to switch 35. Switch 35 has a bias voltage applied thereto from a bias supply 36. When the voltage across resistor 31 reaches a particular value (when M switches are actuated) switch 35 is actuated, turning on a scram alarm. The "M out of N" logic circuit shown in FIG. 2 is well known in the art and any circuit similar to this can be used.

In the above-described system, the coolant outlet temperature sensors of a number of subasssemblies are combined in a logic circuit for the purpose of generating a scram signal. In order to generate the scram signal, M temperature sensors must indicate a temperature in excess of a predetermined value. In this way no redundancy is required for the temperature sensors for each subassembly. Since the protection is aimed at local core accidents, M should not be too large. However, in order to provide sufficient redundancy and also protect against spurious scrams, M must not be too small. A logic choosing M equal to 3 or 4 allows one or two temperature sensors to fail before repair becomes necessary, thus providing a degree of redundancy to the system without requiring that each subassembly have a plurality of separate temperature sensors located therein. The table below shows some possible arrangements of temperature sensors for scram channels, 1,000-magawatt plant with 265 subassemblies.

| Core region covered per scram channel (in number of subassemblies) | Proposed logic for sensors | Minimum required number of sensors per subassembly | Number of— Sensors | Number of— Scram channels |
|---|---|---|---|---|
| 1 | 2 out of 3 | 3 | 795 | 265. |
| 7 | 3 out of 7 | 1 | 265 | ~38. |
| 19 | 3 out of 19 | 1 | 265 | ~14. |
| 19 | 4 out of 19 | 1 | 265 | ~14. |
| 37 | 3 out of 37 | 1 | 265 | 7 to 8. |
| 37 | 4 out of 37 | 1 | 265 | Do. |

Figure 3:
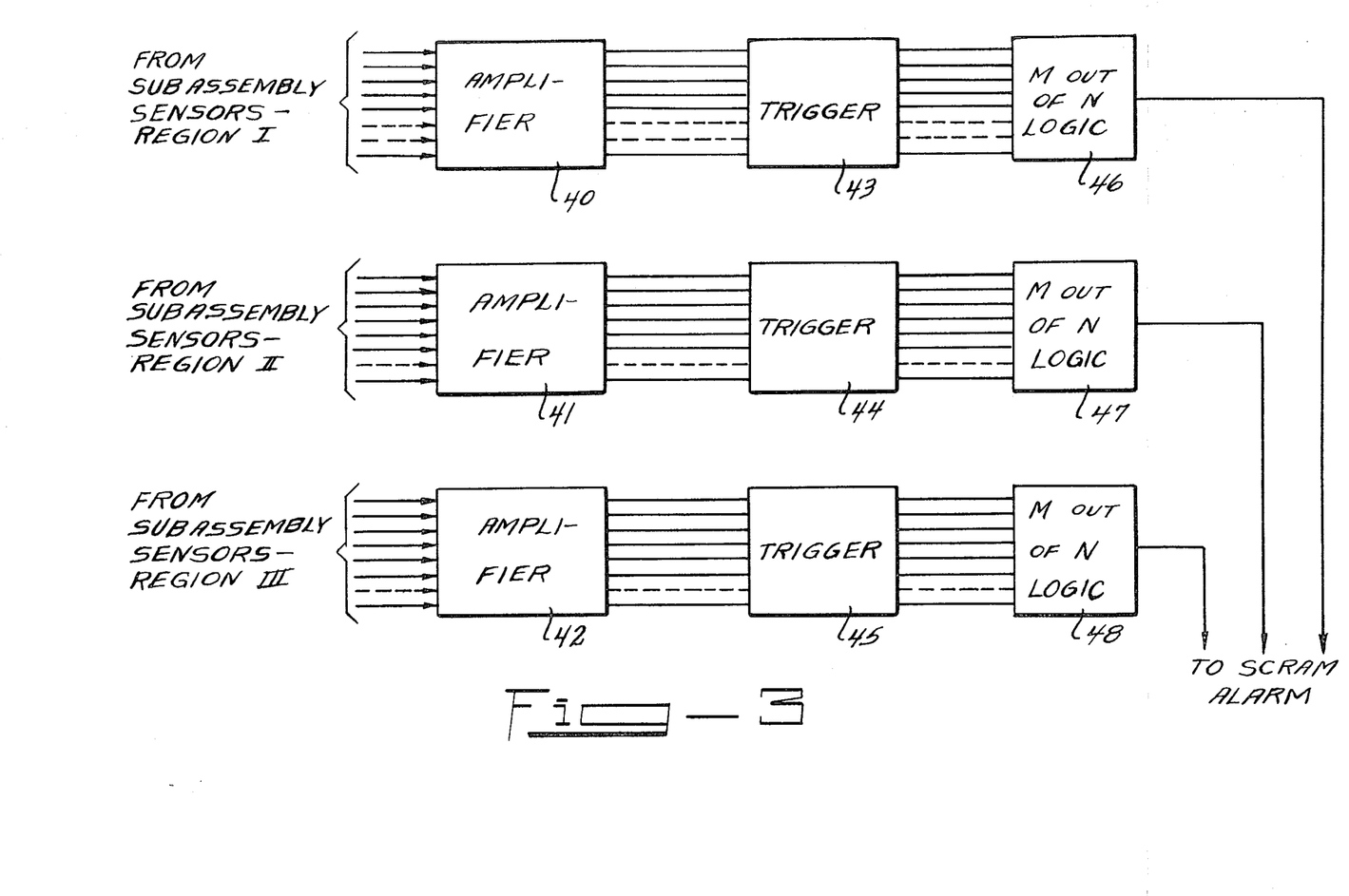
FIG. 3 is a block diagram illustrating the circuitry for detecting failures in a plurality of subassembly regions.

Referring to FIG. 3, there is shown a block diagram of a portion of logic circuitry for a reactor core having a number of subassembly regions. The sensor inputs from subassembly region are applied to amplifier circuit 40. The sensor inputs from other subassembly regions are applied to amplifier circuits 41 and 42. Each subassembly region in the core has its own amplifier circuit. The outputs of the amplifiers are applied to the trigger circuits 43 to 45 and the outputs of the trigger circuits are applied to the M out of N logic circuits 46 to 48. Each of the M out of N logic circuits is a separate scram channel, developing its own scram signal. The number of channels required would depend upon the number of subassembly regions in the reactor.

Figure 4:
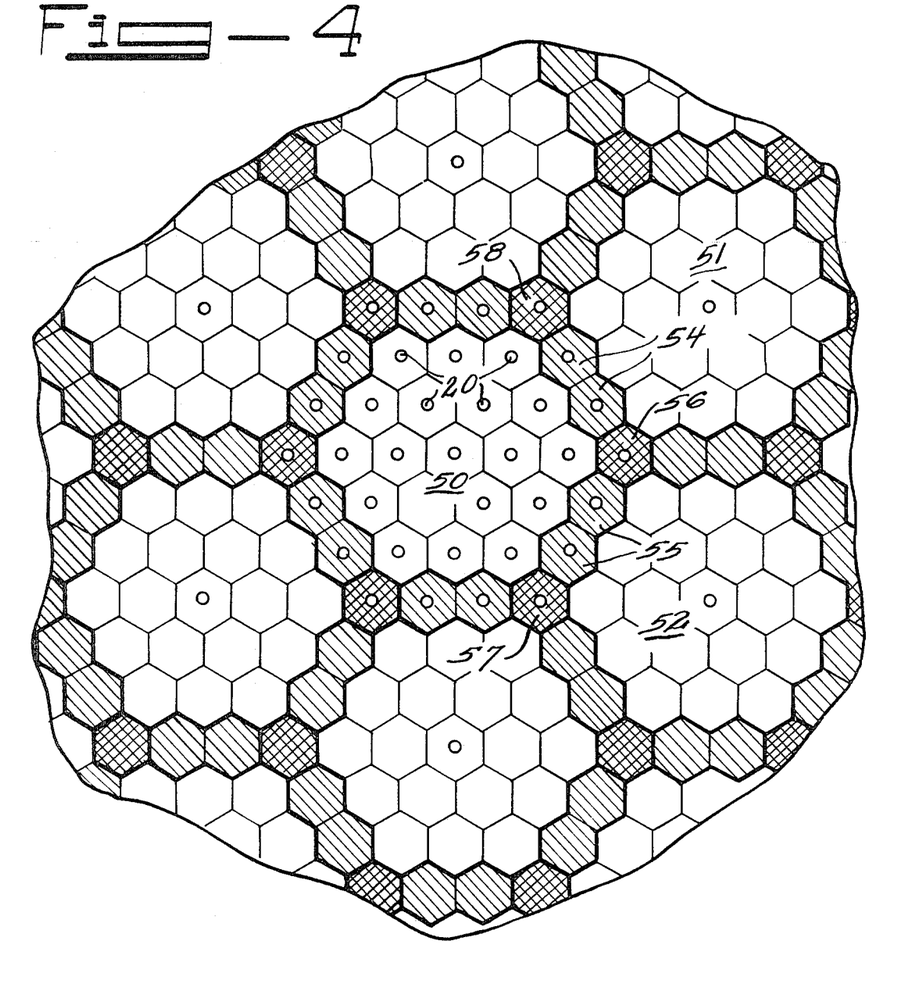
FIG. 4 is a view of the reactor core showing overlapping of the subassembly regions.
Figure 5:
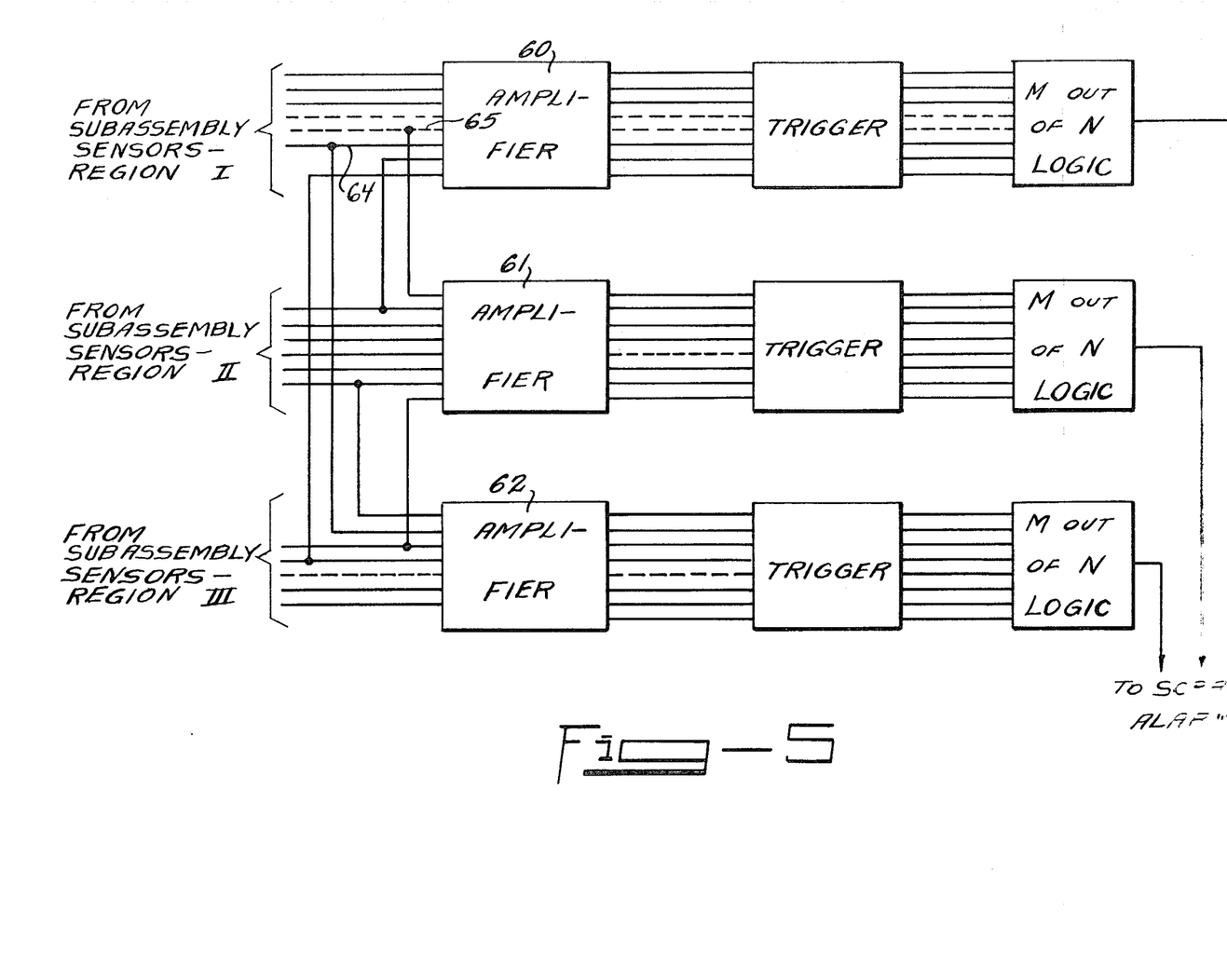
FIG. 5 is a block diagram illustrating the circuitry used with overlapping core configuration.

Referring to FIG. 4, there is shown a reactor core in which the subassembly regions overlap. Subassembly region 50 contains 37 subassemblies as do subassembly regions 51 and 52. Subassemblies 54, 56 and 58 are border subassemblies and overlap subassembly regions 50 and 51, while subassembly regions 55, 56 and 57 overlap subassembly regions 50 and 52. Subassembly region 56 is common to all three subassembly regions 50, 51 and 52. The output of each of the sensors in the overlapping subassemblies goes to the scram channels of each of the overlapping subassembly regions, as shown in FIG. 5. The input 64 from a sensor in a border subassembly of subassembly regions I and III is coupled to amplifiers 60 and 62, while input 65 from a sensor in a border subassembly of subassembly regions I and II is coupled to amplifiers 60 and 61. As can be seen from the block diagram, there are inputs from sensors of regions II and III connected in a similar manner. The remaining portions of the scram channels are as described above and act to produce a scram alarm in a similar manner. By using overlapping subassemblies in the subassembly regions, the number of subassemblies in each region can be increased while the portion of the core covered by each subassembly remains sufficiently small to give adequate protection.

The protection system so far described does not offer sufficient protection against sodium voiding or rather extensive fuel damage to a single subassembly. It is assumed that the outlet temperature sensors of adjacent subassemblies will only give a higher level signal after these subassemblies have been affected through, for example, mechanical distortion, melt-through, etc. from the affected subassembly. Under this assumption these scram channels would, however, still provide protection against reactivity accidents caused by fuel movement in two or more subassemblies and would therefore be valuable as a backup protection system. A scram command signal could, however, be generated in the early stages of a localized accident if, through mixing of the outlet flow of the affected subassembly with coolant flow of the adjacent subassembly, some degree of localized coupling between outlet temperatures were to be achieved. In that case, the outlet temperatures of immediately adjacent subassemblies would be influenced by the higher than normal outlet temperature of a subassembly having sustained a flow reduction so that a scram command signal could be generated. For example, for reasons of symmetry, one could chose to mix the coolant from one subassembly with the three or six adjacent subassemblies. If the affected subassembly has an outlet temperature of 800° C., that is, the threshold value for clad failure, mixing ⅓ of the coolant from a subassembly with three adjacent subassemblies would cause a temperature rise of approximately 10° C. If the coolant from the affected subassembly were mixed with six adjacent subassemblies, the temperature rise would be approximately 5° C. If one-half of the fluid from the affected subassembly were mixed with six adjacent subassemblies, the temperature rise would be nearly 8° C., while mixing with three adjacent subassemblies would give a temperature rise of approximately 14° C.

The amount of mixing which would be required is a matter of design choice and depends upon the degree of protection desired. If a 3/7 logic is used, then there has to be a high outlet temperature in one subassembly coincident with a temperature increase in two adjacent subassemblies. Mixing with either three or six adjacent subassemblies would be permitted in this system since a single sensor failure would still permit the 3/7 logic to work. However, if a 4/7 or greater logic is used, then the outlet fluid from the affected subassembly must be mixed with more than three adjacent subassemblies.

Figure 6:
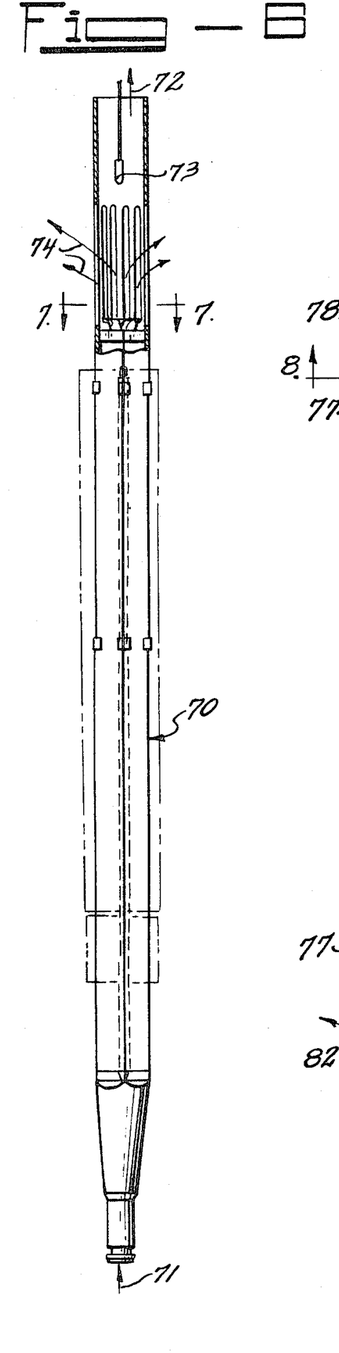
FIGS. 6 to 8 illustrate a core subassembly structure with provisions for mixing the cooling fluid after it has passed through the subassembly.

Referring to FIG. 6, there is shown a view of a subassembly 70. Cooling fluid, which may be, for example, liquid sodium, enters at the bottom of the subassembly (arrow 71) and exits at the top of the subassembly (arrow 72). A sensor 73 is positioned in the flow path to measure the temperature of the fluid after it has been heated by the fuel in the subassembly. As shown by the arrows 74, a portion of the fluid is deflected to openings in the subassembly wall and will mix with fluid in adjacent subassemblies which are positioned adjacent the subassembly 70 shown.

Figure 7:
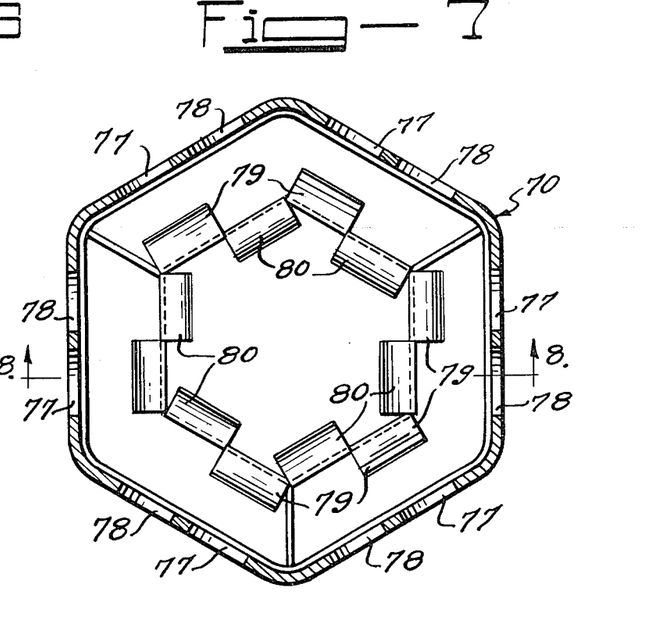
Figure 8:
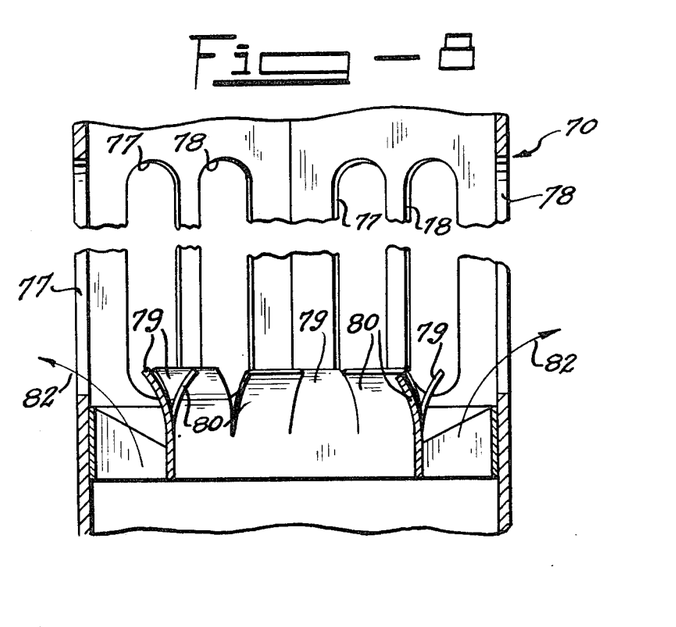

In FIGS. 7 and 8 there is shown cross-sectional views of the subassembly 70 showing the mixing vanes which will mix the fluid from the subassembly with the fluid from the six adjacent subassemblies. The subassembly 70 has six exit ports 77 and six inlet ports 78. The inlet ports 78 receive fluid from the adjacent subassemblies and mix this fluid coolant with the coolant from the subassembly so that the temperature of the coolant fluid leaving the subassembly reflects the amount of heat energy generated within the subassembly and the amount of heat energy generated within the adjacent subassemblies. Fluid from the subassembly is deflected through each of the subassembly exit ports 77 by means of deflectors 79 positioned around the subassembly. As shown in FIG. 8, the deflectors 79 are curved baffles which deflect the coolant flowing along the periphery of the subassembly through the exit ports 77, as shown by the arrows 82. Curved baffles 80 are also positioned in the subassembly to facilitate receiving coolant from adjacent subassemblies and mixing the received coolant with the coolant in the subassembly.

Figure 9:
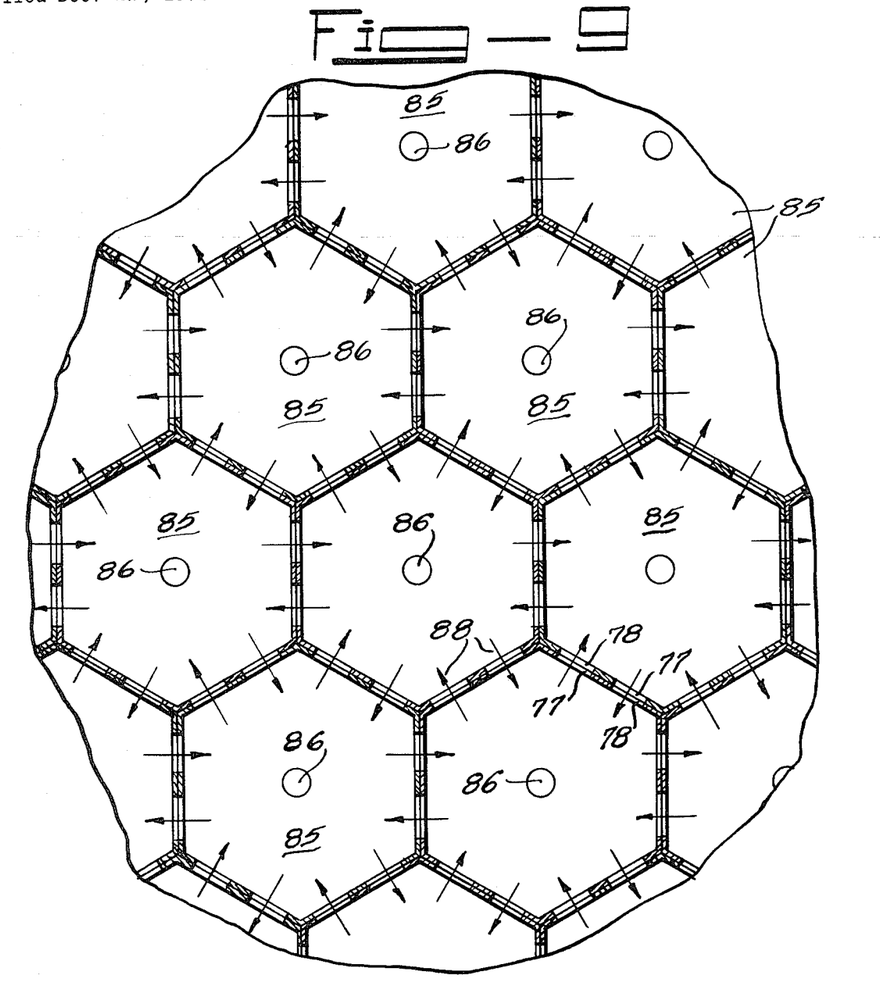
FIGS. 9 and 10 illustrate the mixing patterns for coolant flowing through the subassemblies of the reactor core.

Referring to FIG. 9, there is shown a plurality of subassemblies 85, each having a sensor 86 positioned therein. As shown in one of the walls between the adjacent subassemblies, the exit port 77 of one subassembly is positioned adjacent the inlet port 78 of a second subassembly, while in the same wall of the subassembly the inlet port 78 of the first subassembly is positioned adjacent the exit port 77 of the second subassembly. FIG. 9 shows a plurality of arrows which protrude through the ports in the adjacent subassemblies. These arrows, two of which are indicated by reference numeral 88, represent the flow between the adjacent subassemblies. It can be seen from FIG. 9 that each subassembly delivers a portion of its cooling fluid to six adjacent subassemblies and also receives cooling fluid from six adjacent subassemblies. By this means a localized core accident in a single subassembly produces a heating effect which is distributed to adjacent subassemblies so that the required number of sensors will detect the heat rise to produce a scram signal. This also gives the system a degree of redundancy without requiring that each of the subassemblies have more than one temperature sensor 86.

Figure 10:
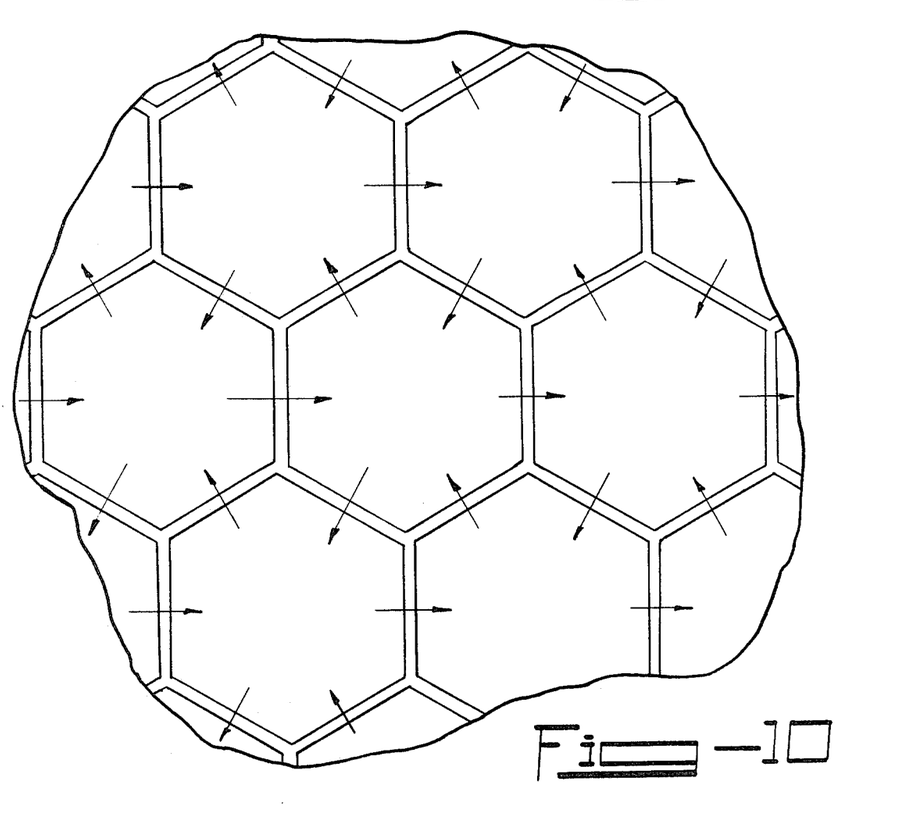

Referring to FIG. 10, there is shown a portion of the core in which the fluid flow between adjacent subassemblies is indicated by arrows. In the interest of simplicity only the fluid flow between the adjacent subassemblies is shown and the wall structure is not shown in detail. The wall structure for the subassemblies of FIG. 10 woud be similar to that shown in FIGS. 6 through 9. In FIG. 10, a portion of the cooling fluid from each subassembly is diverted to three adjacent subassemblies. Each subassembly also receives cooling fluid from three adjacent subassemblies. The degree of redundancy in the system of FIG. 10 is less than that in FIG. 9. However, with the diversion of the same amount of cooling fluid to adjacent subassemblies, a higher degree of heating can be achieved, thus reducing noise effects. While the symmetry of the subassemblies of the reactor core lend themselves to the three or six system, the mixing could be done with a single subassembly or with two, four or five as desired. The ultimate choice would be a matter of compromise between the various design objectives in the reactor protection system. The mixing system is also applicable to the reactor protection system whether the border subassemblies of the subassembly regions overlap or do not overlap. The circuitry used to develop the scram alarms is the same as that shown in FIGS. 2, 3 and 5.

Figure 11:
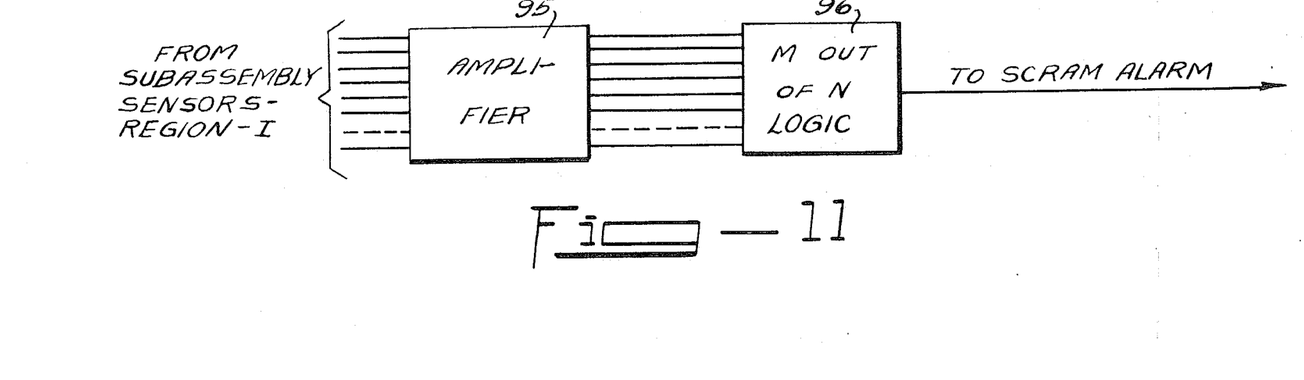
FIGS. 11 and 12 are block diagrams showing the circuitry for use when coherence between subassembly regions is required to actuate a scram alarm.

In a reactor protection system of this type, noise voltages developed in the sensors and the cables can be sufficiently strong to give an alarm, causing spurious scrams. In the scram alarm circuitry of FIG. 2, a temperature rise in a sensor great enough to actuate above a predetermined level would actuate a trigger in the trigger circuit and the trigger circuit would maintain an output indicating an alarm condition until the trigger was reset. If the noise voltages were particularly high, triggers could be set by the noise voltages and, after the predetermined number of trigger circuits had been set depending upon the value of M, a spurious scram would result. In the circuitry of FIG. 11, the sensors from a region are connected to an amplifier 95 which is connected directly to the M out of N logic 96. By eliminating trigger circuits from the scram channel, a coherence is required between the temperature sensed in the reactor core. Since noise voltages are random, it is unlikely that three or four of the sensors from the particular region would receive a strong noise voltage at the same time. However, a failure in the core region would actuate many of the sensors in that region at the same time so that the coherence between the coolant high-temperature condition sensed by the sensors would develop the scram signal. By this means there is a discrimination against spurious noise signals.

Figure 12:
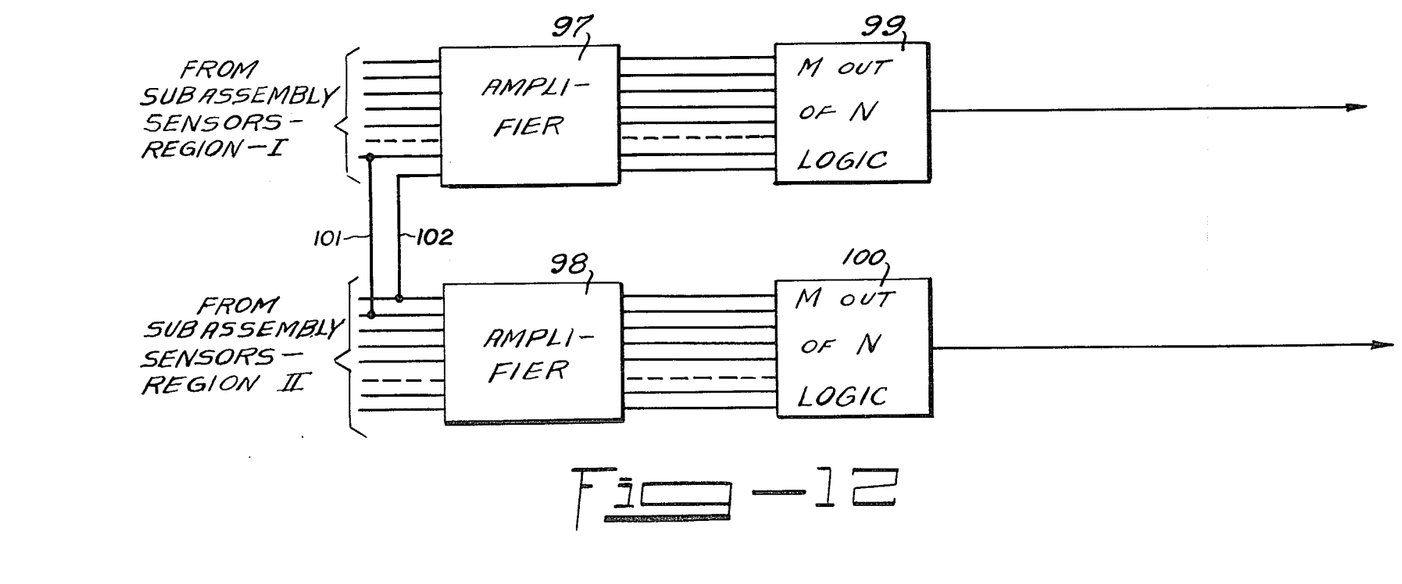

In the circuit of FIG. 12, the connections for a protection system in which the border subassemblies overlap subassembly regions are shown. The sensors from subassembly region I are coupled to amplifier 97 and the output of amplifier 97 is coupled to M out of N logic 99. The sensors from subassembly region II are coupled to amplifier 98 and the output of amplifier 98 is coupled to M out of N logic 100. Input 101 from a sensor in the border subassembly of subassembly region I is also coupled to amplifier 98, while an output 102 from a sensor in the border region of subassembly region II is coupled to amplifier 97.

The embodiments of the invention in which an exclusive property or privilege is claimed are defined as follows:

1. A monitoring system for a nuclear reactor core having a plurality of subassembly regions with a plurality of subassemblies in each subassembly region, the reactor further having a cooling fluid flowing through each of said subassemblies, said monitoring system comprising, mixer means for each of said subassemblies for mixing a portion of said cooling fluid leaving the subassembly with the cooling fluid leaving at least one of the subassemblies adjacent thereto, a plurality of sensors for measuring a parameter of the cooling fluid, each of the subassemblies having a sensor positioned in the cooling fluid flowing out of the subassembly after the location where said mixing takes place, a plurality of logic means equal to the number of subassembly regions with each of said logic means being associated with a particular one of the subassembly regions, each of the sensors of a particular subassembly region being coupled to the logic means associated therewith, each of said logic means being responsive to each sensor coupled thereto to develop an alarm signal with the parameter measured by the sensor in a predetermined range, each of said logic means further being responsive to said alarm signals to develop a scram signal with the number of said alarm signals equal to M where $1 < M < N$ and where N is the total number of sensors coupled to said logic means.

2. The monitoring system of claim 1 wherein, said sensors are temperature sensors to measure the temperature of the cooling fluid after flowing through each of the subassemblies, said logic means developing said alarm signal with the temperature of the cooling fluid being greater than a predetermined level.

3. The monitoring system of claim 2 wherein, the reactor core includes border subassemblies positioned between adjacent subassembly regions, each of said border subassemblies having a temperature sensor positioned to measure the temperature of the cooling fluid flowing out of the subassembly, each of said border subassembly temperature sensors being coupled to each of said logic means associated with said adjacent subassembly regions.

References Cited

UNITED STATES PATENTS

| | | | |
|---|---|---|---|
| 3,424,652 | 1/1969 | Oehmann | 176—19 R |
| 3,437,556 | 4/1969 | Bevilacqua et al. | 176—19 R |
| 3,109,929 | 11/1963 | Picard | 176—19 LD |
| 3,161,569 | 12/1964 | Donguy et al. | 176—19 LD |
| 3,501,377 | 3/1970 | Germer | 176—19 R |
| 3,565,760 | 2/1971 | Parkos et al. | 176—19 |

REUBEN EPSTEIN, Primary Examiner